(12) United States Patent
Budde

(10) Patent No.: US 7,320,548 B2
(45) Date of Patent: Jan. 22, 2008

(54) BEARING SHELL FOR A BALL AND SOCKET JOINT

(75) Inventor: Frank Budde, Damme (DE)

(73) Assignee: ZF Lemförder Metallwaren AG, Stemwede-Dielingen (DE)

( * ) Notice: Subject to any disclaimer, the term of this patent is extended or adjusted under 35 U.S.C. 154(b) by 116 days.

(21) Appl. No.: 10/894,332

(22) Filed: Jul. 19, 2004

(65) Prior Publication Data

US 2004/0264821 A1    Dec. 30, 2004

Related U.S. Application Data

(63) Continuation of application No. PCT/DE03/02403, filed on Jul. 17, 2003.

(30) Foreign Application Priority Data

Aug. 10, 2002  (DE) ................................ 102 36 829

(51) Int. Cl.
*F16C 23/04*      (2006.01)
(52) U.S. Cl. .................................................... 384/206
(58) Field of Classification Search ................ 384/145, 384/206–214
See application file for complete search history.

(56) References Cited

U.S. PATENT DOCUMENTS 3,597,025 A * 8/1971 Ringel .......................... 384/209
4,137,618 A   2/1979 Krauss
4,317,338 A * 3/1982 Jordan .......................... 384/206
5,219,231 A * 6/1993 Sheedy ......................... 384/206

FOREIGN PATENT DOCUMENTS

DE    30 38 248 A1    4/1982
DE    41 08 219 A     9/1992
DE    42 20 327 C1    6/1993

* cited by examiner

*Primary Examiner*—Thomas R. Hannon
(74) *Attorney, Agent, or Firm*—McGlew and Tuttle, P.C.

(57) ABSTRACT

A bearing shell with a spherical bearing surface for a ball and socket joint preferably for use in chassis suspensions or steering mechanisms of motor vehicles, which has essentially a joint housing and a bearing journal, which comprises a spherical surface and a pivot part and which is mounted with the spherical surface rotatably and deflectably in the spherical bearing surface of the bearing shell fixed in the joint housing, is presented, in which a filament fabric is embedded according to the present invention in the thermoplastic of the bearing shell (5, 11, 12, 13, 14, 15) at least in a partial area. In addition, the present invention pertains to a process for manufacturing an above-described bearing shell from thermoplastic, in which a bearing shell blank (1, 9) provided with an essentially circular outer contour is fashioned out of a sheet-shaped thermoplastic semifinished product, in which a filament fabric had been embedded, and in which the final shape of the bearing shell (5, 11, 12, 13, 14, 15) with spherical bearing surface is brought about in a subsequent processing operation by heating the thermoplastic material above its melting point and subsequent mechanical deformation of the bearing shell blank (1, 9).

23 Claims, 4 Drawing Sheets

BEARING SHELL FOR A BALL AND SOCKET JOINT

CROSS REFERENCE TO RELATED APPLICATION

This is a continuation of and claims the benefit (35 U.S.C. § 120 and 365(c)) of copending International Application PCT/DE 2003/002403 of 17 Jul. 2003, which designated inter alia the United States and which claims the priority of German Application DE 102 36 829.5 of 10 Aug. 2002. The entire contents of each application is hereby incorporated by reference in its entirety.

FIELD OF THE INVENTION

The present invention pertains to a bearing shell arrangement, and process for forming, with a bearing shell made of a thermoplastic with a spherical bearing surface for a ball and socket joint preferably for use in chassis suspensions or steering mechanisms of motor vehicles, which has essentially a joint housing and a bearing journal, including a spherical surface and a pivot part and which is mounted with the spherical surface rotatably and deflectably in the spherical bearing surface of the bearing shell fixed in the joint housing.

BACKGROUND OF THE INVENTION

Many different designs of bearing shells of the type of this class described are known and are made preferably from thermoplastics, for example, POM (Polyoxymethylene).

The material used for such bearing shells has the disadvantageous property that especially under increased loads of the ball and socket joint equipped with such bearing shells, the material of the bearing shell tends to creep, and failure of the ball and socket joint in question cannot be ruled out due to the elasticities that occur, especially in case of prolonged stress and at elevated temperatures.

To remedy this situation, the possibility of using plastics that belong to the group of the duroplastics is known from the state of the art. For example, a bearing shell that consists of a multi component duroplastic is known from DE 41 08 219 C2, in which a fiber braiding consisting of glass fibers is embedded in the plastic. These are so-called short fibers, whose length is in a range of 0.1 mm to 1 mm. The manufacture of such bearing shells with inserted fabric braiding of the type described for an increased load on ball and socket joints is relatively complicated and requires special manufacturing steps.

SUMMARY OF THE INVENTION

The object of the present invention is therefore to provide a bearing shell of the type of this class, which can be manufactured at low cost in a simple manner and can meet high requirements concerning loadability and service life. Moreover, one object to be accomplished is to disclose a process for manufacturing such a ball socket, in which no special manufacturing technological know-how is necessary for the handling of special fiber-reinforced materials.

Concerning the bearing shell, the object is accomplished by embedding a filament fabric in the thermoplastic of the bearing shell at least in a partial area. As an alternative to the short fibers used in the state of the art so far in conjunction with duroplastics, the use of filament fabrics in conjunction with the thermoplastic makes possible a high strength and rigidity—with dynamic compressive strength values of up to 200 N/mm2 as well as a sufficient impact strength of the bearing shells according to the present invention. Moreover, the temperature resistance, the corrosion resistance and the chemical resistance of such thermoplastics provided with filaments can also be considered to be favorable for use in bearing shells. The embedding of the filament fabric leads, moreover, to high creep resistance as well as to low wear, contrary to usual thermoplastic materials. The thermoplastic basic material of the bearing shell offers the possibility of deforming the bearing shell in a simple deformation process by heating the plastic material beyond its melting point.

In particular, glass fibers, carbon fibers and aramid fibers in the plastic proved to be advantageous materials for the filament fabric.

The process of manufacturing a bearing shell with the above-described features, which are beneficial in the present invention, is characterized in that a bearing shell blank is provided essentially with a circular outer contour that is first fashioned mechanically out of a sheet-shaped thermoplastic semifinished product, in which a filament fabric had been embedded. The final shape of the bearing shell with a spherical bearing surface is brought about in a subsequent processing step by heating the thermoplastic material above its melting point and subsequent mechanical deformation of the bearing shell blank.

Extremely inexpensive manufacture of the bearing shell can be achieved due to the process steps described, because the thermoplastic semifinished products used with filament fabric embedded in them can be produced efficiently in large lots, e.g., on double belt presses. The fashioning out of the bearing shell blanks by mechanical processing, for example, sawing, milling, water jet cutting and the like, likewise offers the possibility of inexpensive manufacture. Finally, the basic component of the thermoplastic semifinished product is essential for the easy deformation of the bearing shell blank into the final shape of the bearing shell.

Corresponding to the inventive variants of the process described, it may be especially advantageous to introduce at least one slot-like recess extending to the middle of the bearing shell blank into the circular outer contour of the bearing shell blank. The slot-like recess facilitates the deformation of the flat bearing shell blank into a spherical shape, because the needless displacement or compression of material can be eliminated due to the final shaping. The slot-like recess may have different shapes.

Moreover, provisions are made in another advantageous embodiment of the process to design the bearing shell blank as a circular ring, where additional areas consisting of thermoplastic material without filament fabric may be injected onto the existing circular ring cross section within the framework of the deformation process to prepare a spherical bearing shell. Especially highly stressed partial areas of the bearing shell can be formed in this manner with the highly resistant thermoplastic material with the embedded filament fabric, whereas the pure thermoplastic material may be used in low-stress areas.

It is conceivable, of course, in this connection to likewise introduce slot-like recesses into the flat, circularly ring-shaped bearing shell blank in order to facilitate its deformation. The bearing shell according to the present invention as well as the corresponding process for manufacturing same will be described in greater detail below on the basis of the attached figures.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1A:
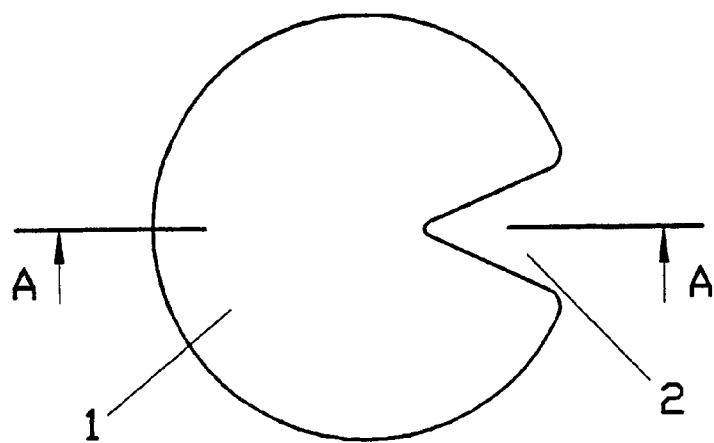
FIG. 1A is a top view of a bearing shell blank after it had been fashioned out of a sheet-shaped thermoplastic semifinished product.

Referring to the drawings, a bearing shell according to the present invention is manufactured with the use of a sheet-shaped thermoplastic semifinished product, in which a filament fabric from glass fibers, synthetic fibers, aramid fibers or a combination of the fibers had been embedded. The blank described is produced in so-called double-belt presses, and the production process makes it possible to introduce carbon fiber layers on one side of the sheet-shaped blank, and glass or aramid fibers on the opposite side. The cost of manufacturing such semifinished products, also called organoplates, can be considered to be favorable compared with other structures reinforced with filament fabrics. Due to the embedding of a filament fabric, the strength and rigidity of such organoplates are in the range of up to 200 N/mm2 of dynamic compressive strength. In addition, such semifinished plastic products have high temperature resistance, corrosion resistance and chemical resistance. Despite these advantages in terms of the mechanical properties, such semifinished products can be thermally deformed by heating the basic structure of the thermoplastic above its melting point.

Figure 1B:
FIG. 1B is a sectional view along the section line A-A in FIG. 1A.

FIG. 1A shows a bearing shell blank which was fashioned out of a sheet-shaped semifinished product of the above-described type by mechanical processing steps such as milling, cutting or stamping. Due to the final spherical shape of the bearing shell to be formed, the outline of the bearing shell blank 1 is essentially circular, and it is apparent from FIG. 1A that at least one recess 2 is formed in the circular outer contour of the bearing shell blank 1, the recess having a relatively broad opening toward the outer contour and tapering toward the inside, i.e., the middle of the sheet-shaped bearing shell blank 1. To illustrate the sheet-shaped cross section, this cross section is additionally shown in a sectional view in FIG. 1B.

After the bearing shell blank 1 has been prepared corresponding to FIG. 1A, a deformation process is carried out to form the final shape of the bearing shell according to the present invention, and this deformation process is first preceded by the heating of the thermoplastic material of the bearing shell blank 1 above the corresponding melting point of the thermoplastic.

Figure 2A:
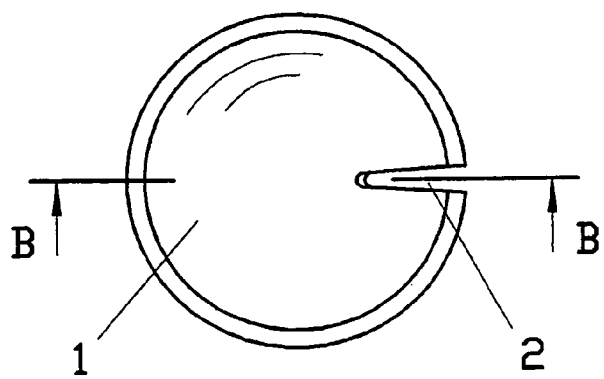
FIG. 2A is a top view of the spherically deformed bearing shell blank from FIG. 1A.
Figure 2B:
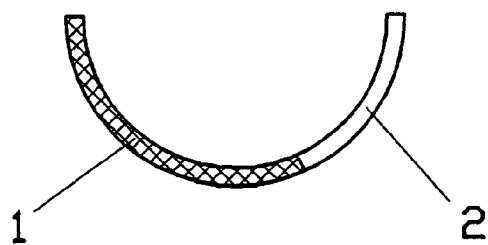
FIG. 2B is a sectional view along section line B-B from FIG. 2B.

After heating, a spherical shape of the bearing shell blank 1 corresponding to the sectional view in FIG. 2B is formed by means of corresponding suitable tools. At the same time, the recess 2 is correspondingly reduced or possibly closed entirely, as this is shown in the top view in FIG. 2A, by the deformation into a hemispherical three-dimensional shape. For example, the bearing shells 5 shown in FIGS. 3A through 3C can be manufactured by means of the process steps as illustrated in FIGS. 1A through 2B. The feature common to all the exemplary embodiments shown is that the bearing shell 5 formed from the bearing shell blank 1 has been provided with additional thermoplastic attachment elements 3, for example, by an injection operation. The additional attachment elements 3 are used primarily for the design embodiment of the outer contour to fix the finished bearing shell 5 in a ball and socket joint housing, which is not shown here.

Figure 3A:
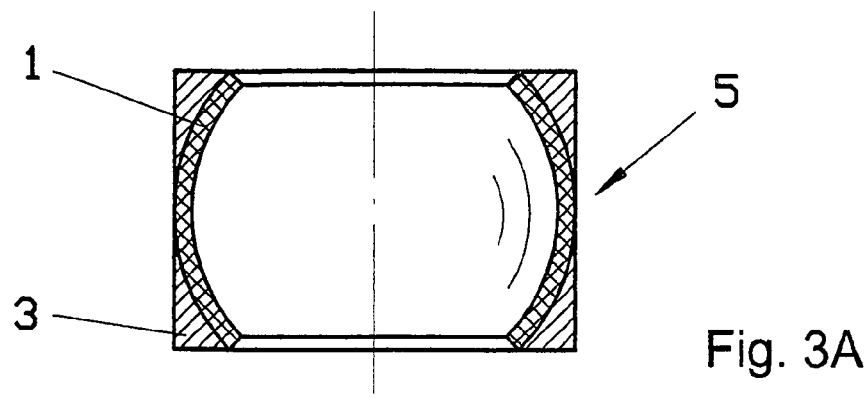
FIGS. 3A, 3B, 3C are sectional views of embodiments of the bearing shell according to the present invention for use in different types of ball and socket joints.
Figure 3B:
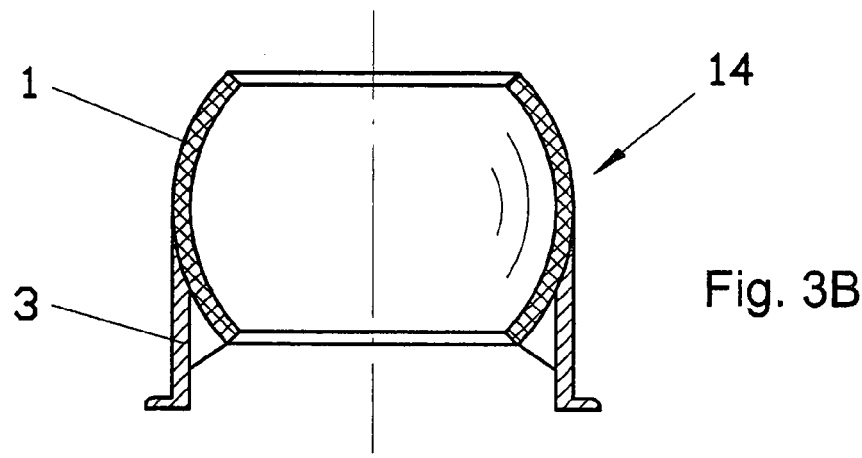
Figure 3C:
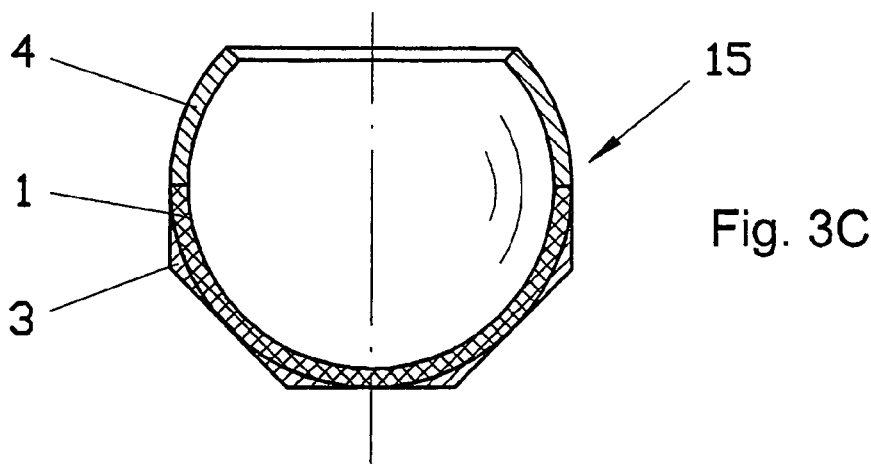

FIG. 3A shows, for example, a bearing shell 5 for a sleeve joint. FIG. 3B shows a bearing shell 14, which can be loaded especially in the radial direction. The bearing shells 5, 14 corresponding to this exemplary embodiment, which are reinforced with the filament fabric, may also be formed from two opposite half shells. Finally, FIG. 3C shows a bearing shell 15 in a view corresponding essentially to those in FIGS. 2A and 2B with a thermoplastic attachment injected onto this bearing shell 15.

It is possible, in principle, to mount the spherically shaped additional shell 4 in the ball and socket joint as a separate component or to inject it onto the already finished bearing shell 5 containing the embedded filament fabric. The fiber-reinforced bearing shell 5 and the injected additional shell 4 should be manufactured from the same thermoplastic material in such cases in order to achieve good bonding and adhesion of the components to one another.

Figure 4A:
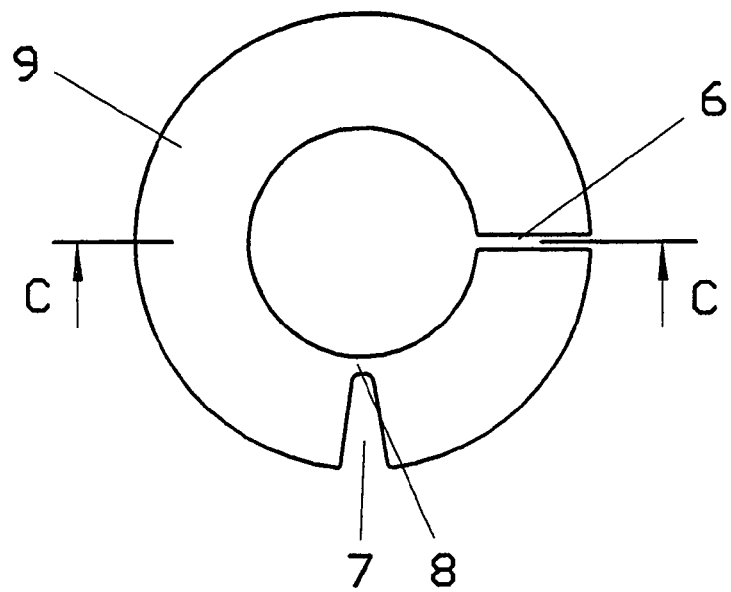
FIG. 4A is a top view of a circular ring-shaped bearing shell blank before its deformation.
Figure 4B:
FIG. 4B is a sectional view of the bearing shell blank from FIG. 4A along the section line C-C.

As an alternative to the manufacture of bearing shells corresponding to the exemplary embodiments described so far, a flat circular ring may also be formed from the sheet-shaped thermoplastic semifinished product corresponding to FIG. 4A. To facilitate subsequent spherical deformations, one or more slot-like recesses may be prepared in this circular ring, as is apparent from the end view in FIG. 5B. FIG. 4A shows two possible variants, in which the recess 6 is designed as a continuous slot, whereas the recess 7, though also extending in a slot-like manner in the direction of the center of the circular ring, ends in a groove bottom 8.

Figure 5A:
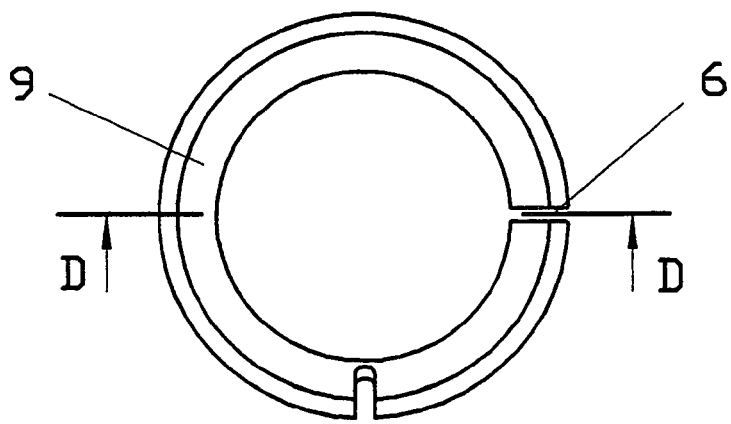
FIG. 5A is a top view of the spherically deformed bearing shell blank from FIG. 4A.
Figure 5B:
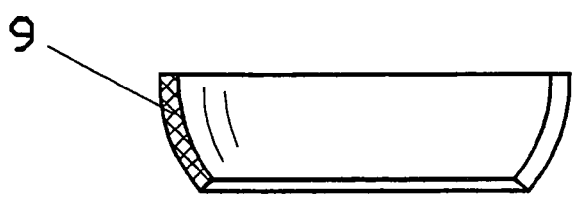
FIG. 5B is a sectional view corresponding to section line D-D from FIG. 5A.

A plurality of recesses 7 distributed over the circular ring circumference of the bearing shell blank 9 are, of course, conceivable as well. After the manufacturing step of fashioning the bearing shell blank 9 out of a sheet-like semifinished plastic product, the bearing shell blank 9 is subjected to a deformation process, which utilizes the thermoplastic properties of the plastic material selected, by the material being heated to a temperature above its melting point. This is followed by the preparation of the spherical contour, as is shown in FIG. 5B, by means of suitable deforming tools.

FIGS. 6A through 6C again show different bearing shells 11, 12, 13 according to the present invention, which have additional attachments 10, which can be made integrally in one piece with the preformed bearing shell blanks 9 within the framework of an injection molding process, next to the areas with the embedded filament fabric. The additional attachments shown may, of course, also be mounted as separate components together with the bearing shell blank 9 in a corresponding ball and socket joint housing.

Figure 6A:
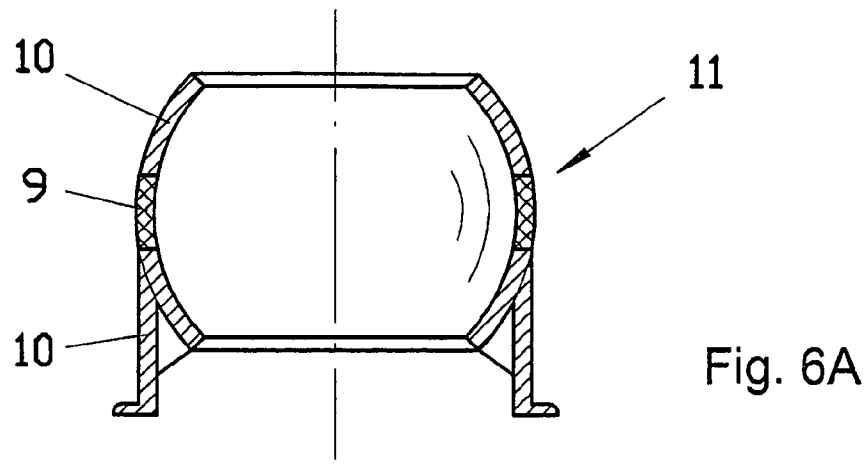
FIGS. 6A, 6B, 6C are sectional views of the bearing shells corresponding to FIGS. 4A through 4D for use in different ball and socket joints.
Figure 6B:
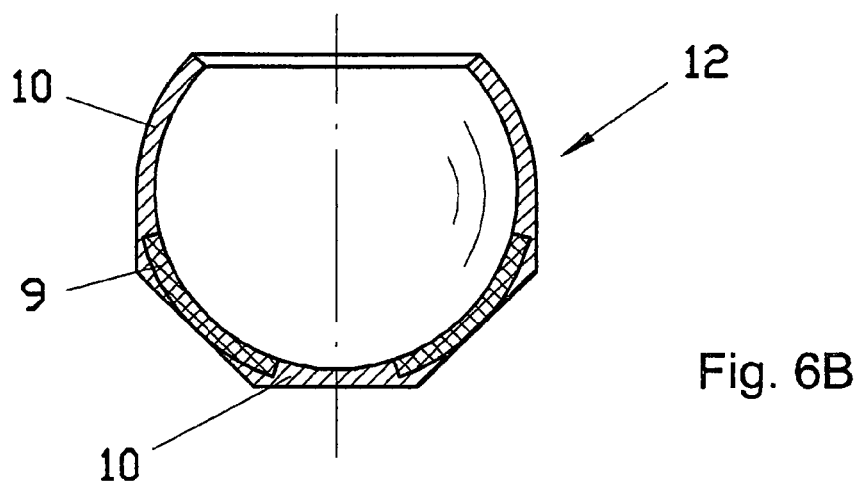
Figure 6C:
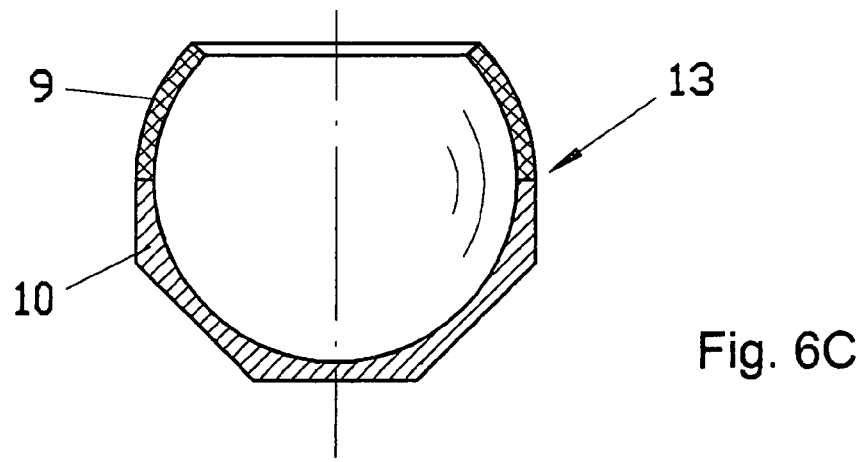

FIG. 6A shows, similarly to the view in FIG. 3B, a bearing shell 11, which is especially suitable for radial loads. FIG. 6B shows the bearing shell 12 of a support joint in a view similar to that in FIG. 3C. Finally, FIG. 6C shows the special design embodiment of a bearing shell 13 for an axial joint.

It is common to all exemplary embodiments shown that at least the highly loaded areas of the bearing shells shown are reinforced with a filament fabric, and that the special thermoplastic properties of the basic material make possible the manufacture of such bearing shells from semifinished plastic products that can be manufactured at low cost.

While specific embodiments of the invention have been shown and described in detail to illustrate the application of the principles of the invention, it will be understood that the invention may be embodied otherwise without departing from such principles.

What is claimed is:

1. A bearing shell arrangement comprising:
   a thermoplastic material;
   a filament fabric partially embedded in said thermoplastic material to form a first bearing shell portion;
   a first attachment composed of said thermoplastic material, said first attachment being connected to said filament fabric partially embedded in said thermoplastic material, said first attachment forming a second bearing shell portion; and
   a second attachment composed of said thermoplastic material, said second attachment being connected to said filament fabric partially embedded in said thermoplastic material, said second attachment forming a third bearing shell portion, whereby said first bearing shell portion, said second bearing shell portion and said third bearing shell portion form an integral bearing shell structure, said first bearing shell portion surrounding an opening of said bearing shell structure, said filament fabric partially embedded in said thermoplastic material being located between said first attachment and said second attachment.

2. An arrangement in accordance with claim 1, further comprising:
   a joint housing, said bearing shell being fixed in said joint housing;
   a spherical bearing surface is provided on said bearing shell;
   a bearing journal including a spherical surface and a pivot part which is mounted with said spherical surface rotatably and deflectably in said spherical bearing surface of the bearing shell.

3. An arrangement in accordance with claim 1, wherein:
   said joint housing is mounted on one of chassis suspension or a steering mechanism of a vehicle.

4. An arrangement in accordance with claim 1, wherein:
   said filament fabric includes glass fibers.

5. An arrangement in accordance with claim 1, wherein:
   said filament fabric includes carbon fibers.

6. An arrangement in accordance with claim 1, wherein:
   said filament fabric includes aramid fibers.

7. An arrangement in accordance with claim 1, wherein:
   said filament fabric includes glass fibers, carbon fibers and aramid fibers.

8. An arrangement in accordance with claim 1, wherein said second bearing shell portion is formed without filament fabric.

9. An arrangement in accordance with claim 8, wherein said opening is closed by said third bearing shell portion, said third bearing shell portion being formed without filament fabric.

10. An arrangement in accordance with claim 1, wherein said opening is closed by said third bearing shell portion.

11. An arrangement in accordance with claim 10, wherein said third bearing shell portion is formed without filament fabric.

12. A bearing shell arrangement comprising:
    a thermoplastic material;
    a filament fabric arranged in said thermoplastic material forming a first bearing shell portion, said thermoplastic material forming a second bearing shell portion, whereby said first bearing shell portion and said second bearing shell portion form an integral bearing shell, said bearing shell having an inner concave spherical bearing surface for contacting a joint ball, said first bearing shell portion and said second bearing shell portion defining said inner concave spherical bearing surface of said bearing shell.

13. A bearing shell in accordance with claim 12, wherein said bearing shell has additional attachments defining an opening and a bottom of said bearing shell, said additional attachments being composed of said thermoplastic material, said filament fibers arranged in said thermoplastic material and said additional attachments defining said concave spherical bearing surface, each additional attachment forming a coherent part of said bearing shell, one of said coherent parts surrounding an opening of the bearing shell, another of said coherent parts forming a bottom portion of said bearing shell.

14. A bearing shell in accordance with claim 13, wherein each of said coherent parts if formed without filament fabric.

15. A bearing shell in accordance with claim 13, wherein said additional attachments are integrated with said bearing shell such that said bearing shell and said additional attachments are one piece.

16. An arrangement in accordance with claim 15, further comprising:
    a joint housing, said bearing shell being fixed in said joint housing; and
    a bearing journal including a spherical surface and a pivot part which is mounted with said spherical surface rotatably and deflectably in said spherical bearing surface of the bearing shell.

17. A bearing shell in accordance with claim 13, wherein said filament fabric arranged in said thermoplastic material is arranged between one additional attachment and another additional attachment.

18. A bearing shell in accordance with claim 13, wherein said filament fabric arranged in said thermoplastic material is arranged between one additional attachment and another additional attachment in an axial direction of said bearing shell.

19. An arrangement comprising:
    a bearing journal including a spherical surface and a pivot part;
    a bearing shell arrangement including a thermoplastic material and a filament fabric arranged in said thermoplastic material, said filament fabric arranged in said thermoplastic forming a first bearing shell portion, said bearing shell having an inner concave spherical bearing surface, said thermoplastic material forming a second bearing shell portion, said first bearing shell portion being integrally connected with said second bearing shell portion to form a continuous bearing shell, said bearing shell having an inner concave spherical bearing surface, said first bearing shell portion and said second bearing shell portion defining said inner concave spherical bearing surface of said bearing shell, said spherical surface of said bearing journal being rotatably and defectably mounted in said inner concave spherical bearing surface such that said inner concave spherical bearing surface engages said spherical surface of said bearing journal, said first bearing shell portion defining an opening of said bearing shell for receiving said bearing journal.

20. A bearing shell in accordance with claim 19, wherein said bearing shell has additional attachments defining said opening and a bottom of said bearing shell, said additional attachments being composed of said thermoplastic material, said additional attachments and said filament fibers arranged in said thermoplastic material defining said concave spherical bearing surface.

21. A bearing shell in accordance with claim 20, wherein said additional attachments are integrated with said bearing shell such that said bearing shell and said additional attachments are one piece.

22. A bearing shell arrangement comprising:
a thermoplastic material;
a filament fabric partially embedded in said thermoplastic material to form a first portion of a bearing shell, said filament fabric including aramid fibers;
a first attachment composed of said thermoplastic material, said first attachment being connected to said filament fabric partially embedded in said thermoplastic material, said first attachment forming a second portion of said bearing shell; and
a second attachment composed of said thermoplastic material, said second attachment being connected to said filament fabric partially embedded in said thermoplastic material, said second attachment forming a third portion of said bearing shell, said filament fabric partially embedded in said thermoplastic material being located between said first attachment and said second attachment.

23. A bearing shell arrangement comprising:
a thermoplastic material;
a filament fabric partially embedded in said thermoplastic material to form a first portion of a bearing shell, said filament fabric including glass fibers, carbon fibers and aramid fibers;
a first attachment composed of said thermoplastic material, said first attachment being connected to said filament fabric partially embedded in said thermoplastic material, said first attachment forming a second portion of said bearing shell; and
a second attachment composed of said thermoplastic material, said second attachment being connected to said filament fabric partially embedded in said thermoplastic material, said second attachment forming a third portion of said bearing shell, said filament fabric partially embedded in said thermoplastic material being located between said first attachment and said second attachment.

\* \* \* \* \*